(12) United States Patent
Kress

(10) Patent No.: US 9,765,903 B2
(45) Date of Patent: Sep. 19, 2017

(54) VALVE

(75) Inventor: Guenter Kress, Ingelfingen (DE)

(73) Assignee: Buerkert Werke GMBH, Ingelfingen (DE)

( * ) Notice: Subject to any disclaimer, the term of this patent is extended or adjusted under 35 U.S.C. 154(b) by 1150 days.

(21) Appl. No.: 13/331,018

(22) Filed: Dec. 20, 2011

(65) Prior Publication Data

US 2012/0161056 A1    Jun. 28, 2012

(30) Foreign Application Priority Data

Dec. 22, 2010  (DE) .................. 10 2010 055 701

(51) Int. Cl.
*F16K 31/126* (2006.01)
*F16K 31/122* (2006.01)

(52) U.S. Cl.
CPC .......... *F16K 31/126* (2013.01); *F16K 31/122* (2013.01)

(58) Field of Classification Search
CPC .......................... F16K 31/126; F16K 31/122
USPC ..... 251/61.4, 61.5, 366, 61, 61.1, 61.2, 61.3
See application file for complete search history.

(56) References Cited

U.S. PATENT DOCUMENTS

| | | | | |
|---|---|---|---|---|
| 3,175,473 A | * | 3/1965 | Boteler et al. | 92/128 |
| 3,241,805 A | * | 3/1966 | Schumann | 251/85 |
| 3,593,958 A | * | 7/1971 | Mueller | 251/61.4 |
| 3,719,343 A | * | 3/1973 | Werra | 251/61.1 |
| 3,884,446 A | * | 5/1975 | Erickson | 251/61.4 |
| 4,211,387 A | * | 7/1980 | Getchell et al. | 251/335.3 |
| 4,238,109 A | * | 12/1980 | Powers | 251/28 |
| 5,279,325 A | * | 1/1994 | Kaspers | 137/270 |
| 2010/0072410 A1 | | 3/2010 | Lacasse et al. | |

FOREIGN PATENT DOCUMENTS

| | | |
|---|---|---|
| DE | 13 00 394 A | 7/1969 |
| DE | 36 06 722 A1 | 9/1987 |
| DE | 10342780 A1 * | 3/2004 |
| DE | 202009007123 U1 | 8/2009 |
| EP | 2253872 A2 | 11/2010 |

OTHER PUBLICATIONS

Machine Translation of EP2253872 provided by the EPO on Jul. 10, 2013.*
Extended European Search Report for European Patent Application EP 11002204.3 (Jul. 14, 2011).
German Patent and Trademark Office, Search Report for DE Pat. Appl. 10 2010 055 701.3, Feb. 1, 2012 (5 pages).
Chinese Patent Office, First Office Action with English Translation, dated Dec. 3, 2014.
Chinese Patent Office, Second Chinese Office Action with English Translation, dated Jul. 28, 2015.

* cited by examiner

*Primary Examiner* — Mary McManmon
*Assistant Examiner* — David Colon Morales
(74) *Attorney, Agent, or Firm* — Steven McMahon Zeller; Dykema Gossett PLLC

(57) ABSTRACT

A valve comprises a drive housing part having a front wall with an aperture being defined by a rim, a substantially tubular intermediate piece having an end projecting through the aperture from outside into the interior of the drive housing part, and a shim part on an inside of the front wall. An end of the intermediate piece is flanged radially outwards over the rim and over the shim part.

7 Claims, 1 Drawing Sheet

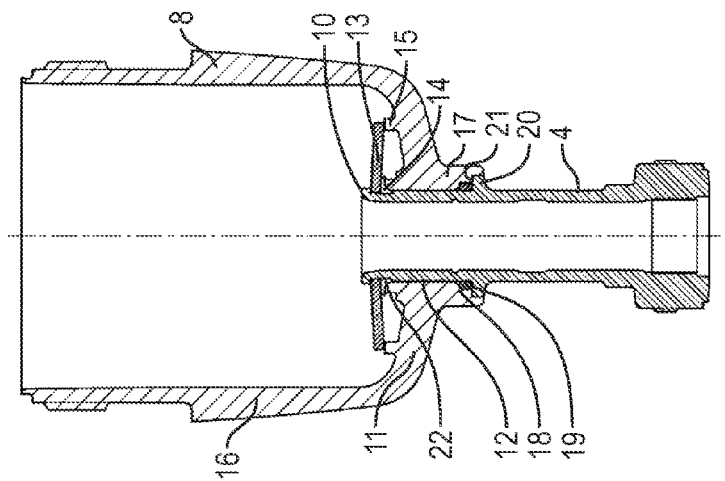
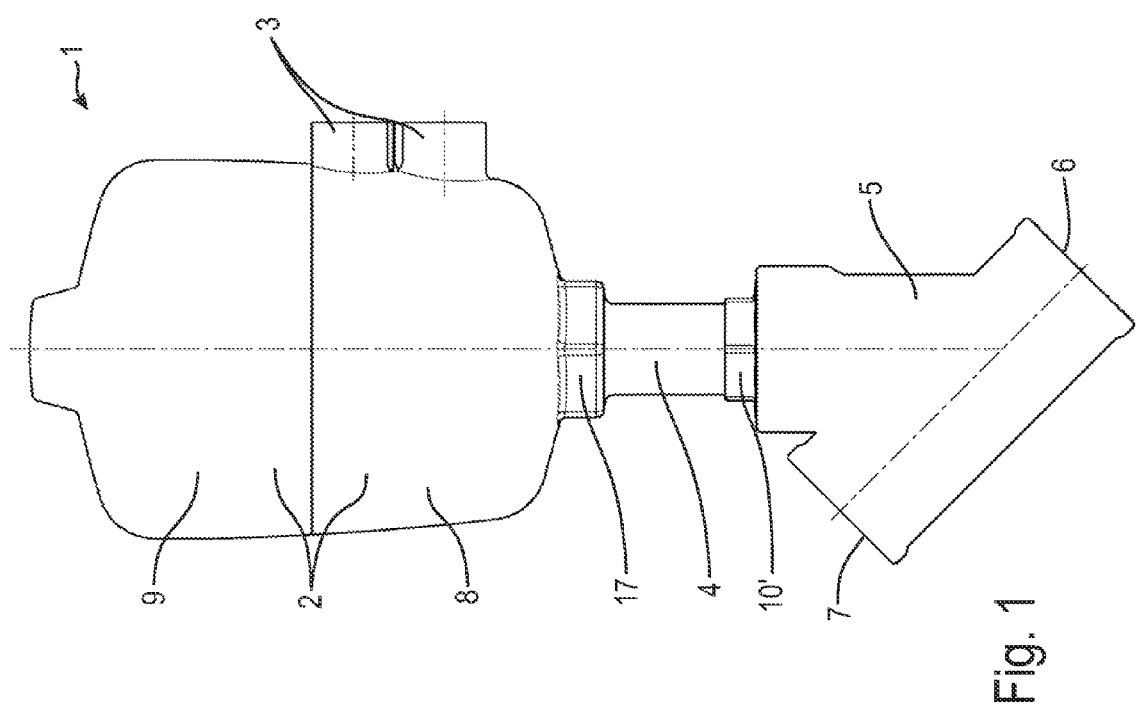

VALVE

CROSS-REFERENCE TO RELATED APPLICATIONS

This application claims priority to German patent application 102010055701.3 filed 22 Dec. 2010. This German application is hereby incorporated by reference as though fully set forth herein.

TECHNICAL FIELD

The invention relates to a valve which includes a drive housing part and a substantially tubular intermediate piece.

BACKGROUND OF THE INVENTION

Valves are usually built up of a drive and a fitting, with a valve housing for fluidic connections. The drive may be pneumatic or electric. Frequently, the valve housing is not connected to the drive directly, but via an intermediate piece similar to a tube. In the prior art, the tube is firmly connected to a drive housing by means of a threaded joint, which is complicated and expensive.

It is therefore the object of the invention to provide a valve which has a drive housing and a tube and which has a simple structure and is cost-effective to manufacture. This object is achieved according to the features of claim 1.

BRIEF SUMMARY OF THE INVENTION

A valve according to the invention comprises a drive housing part having a front wall with an aperture being defined by a rim circumscribing the aperture, a substantially tubular intermediate piece having an end projecting through the aperture from outside into the interior of the drive housing part, and a shim part on an inside of the front wall. An end of the intermediate piece is flanged radially outwards over the rim and over the shim part.

This has the advantage that no screw threads are required between the drive housing part and the intermediate piece. The end of the intermediate plate is plastically deformed outwardly so that the outwardly extending, ring-shaped edge extends over the rim and the shim part. The manufacture of valves according to the invention saves material and, hence, costs, since the manufacturing expenditure required and the necessary wall thicknesses of the individual parts are lower than those required if screw threads are provided. The use of a shim part prevents the aperture from possibly being damaged during the flanging process when the necessary force is applied by an appropriate tool. In this way, the force is evenly distributed to the entire surface of the shim part.

In one embodiment, the shim part has a plate-shaped design. A plate-shaped shim part distinguishes itself by its flat and space-saving geometry which distributes the forces evenly.

It is advantageous to form the shim part as a washer, in particular as a disk spring. The spring, which is prestressed in the assembled condition, provides an axial tolerance compensation, whereby a stable connection is ensured between the drive housing part and the tubular intermediate piece. This is particularly relevant to a reliable tightness if the valve is driven pneumatically, that is, the drive housing is acted upon with compressed air. Furthermore, an axial play is prevented by the spring even if the housing part and the intermediate piece are rotatable in relation to each other.

In a further embodiment, at least one circular rib is arranged on the inner surface of the front wall of the drive housing part to support the shim part. This rib may be configured to be solid or else may include recesses, so that the shim part does not rest on the rib completely, but in sections. The rib prevents any possibly existing sharp-edged rim of the disk spring from digging into the front wall of the drive housing part, which would result in a loss of stability of the drive housing part.

In an advantageous embodiment, the drive housing part is in the form of a pot having the front wall and an adjoining cylindrical housing wall, the cylindrical housing wall and the front wall more particularly continuing into each other in one piece. This reduces the number of parts and tools, which, in turn, has a favorable effect on the manufacturing costs. But it is also possible to manufacture the drive housing part in several parts, for example to provide a separate front wall and a cylindrical housing wall which are firmly connected with each other, for example bolted or welded.

A further embodiment includes a cylindrical, axial extension on the front wall at the aperture, the extension facing outwards and surrounding the intermediate piece. The extension serves as a guide for the tubular intermediate piece and contributes to the stability of the valve. Wrench flats, for example in the form of a hexagon, may be arranged on the surface of the extension facing outwards, so that a tool for opening a mounted valve may engage there.

Advantageously, at least one depression is provided in the extension to receive a sealing member which ensures the tightness from the inside of the drive housing to the outside, something which is of vital importance to pneumatic drives and the application of compressed air that is required there.

One embodiment includes a radially protruding, circumferential projection on the intermediate piece, the projection resting against a contact surface on the extension. This defines a connecting portion on the intermediate piece between the projection and that end of the tube-like intermediate piece which protrudes into the drive housing part, the connecting portion being completely surrounded by the drive housing part.

The contact surface may be formed by an axially terminating edge of the cylindrical extension.

In a further development, the contact surface is formed as part of a step-like recess in the extension at the axial end of the extension. This contact surface is thereby clearly defined and is formed by two surfaces delimiting the step. In addition, in this way the projection is covered by the sleeve-like extension, which, on the one hand, enhances the visual appearance and, on the other hand, contributes to the stabilization of the connection between the drive housing part and the intermediate piece.

Advantageously, the drive housing part is arranged so as to be freely rotatable on the intermediate piece. This allows control air connections of a pneumatic drive to be turned in any desired, selectable direction and adapted to their installation surroundings, so that these connections point towards a compressed air supply. This allows the connecting paths between the valve and the compressed air supply to be kept as short as possible.

In one embodiment, the end of the intermediate piece pointing into the interior of the drive housing has a lower wall thickness than an adjacent tube section, something which facilitates the flanging process. In addition, the preferably step-like transition of the sections having a greater wall thickness and a lower wall thickness provides a stop for the disk spring.

It is advantageous to produce the drive housing from a plastic material. The drive housing part may be produced as an injection molded part, something which provides great freedom in shape forming.

In a further embodiment, only the radially outer rim of the shim part is supported by the front wall or by the rib formed on the front wall. The radially inner rim of the shim part engages the flanged tube end of the intermediate piece. When a disk spring is used, these two rims rest on the support portions to form a prestressing force. The disk spring extends obliquely from its inner rim to its outer rim.

BRIEF DESCRIPTION OF THE DRAWINGS

FIG. 1 shows a side view of a valve according to the invention.

FIG. 2 shows a diagram of a section through a lower part of a drive housing and an intermediate piece connected therewith, of the valve of FIG. 1.

DETAILED DESCRIPTION OF THE PREFERRED EMBODIMENT

FIG. 1 illustrates a side view of a pneumatically driven valve 1. The valve 1 comprises a drive housing 2 having control air connections 3, a tube-like intermediate piece 4, and a fluid housing 5 having an inlet 6 and an outlet 7. The inlet 6 and the outlet 7 are interchangeable, depending on whether it is desired to have the flow approach from below the seat or from above the seat. The intermediate piece 4 connects the drive housing 2 with the fluid housing 5.

The drive housing 2 is structured to have at least two parts, with a pot-shaped drive housing part 8 and a cover 9 closing the housing part 8. A first end 10' of the intermediate piece 4 is firmly connected with the fluid housing 5, for example by a threaded joint. A second end 10 of the intermediate piece 4 is firmly connected with the drive housing part 8. A preferred embodiment of the connection is illustrated in detail in FIG. 2 in a sectional diagram.

The functional valve parts are not illustrated in the drawings for the sake of clarity. They are in line with the general prior art and will be briefly described below. An exemplary structure is involved here, which does not limit the scope of protection and which may, of course, also be of a different design. Arranged between the inlet 6 and the outlet 7 is a valve seat, which can be opened or closed by a sealing member. An electrically or pneumatically displaceable actuating device, which includes a spindle, is arranged in the drive housing 2. The spindle projects into the drive housing 2 by one end, projects through the intermediate piece 4, and projects into the fluid housing 5 by its second end, which cooperates with the sealing member.

FIG. 2 shows a diagram of a section through the drive housing part 8 and the intermediate piece 4 connected with it. The drive housing part 8 includes a front wall 11 having an aperture 12 through which the axial end 10 of the intermediate piece 4 protrudes into the interior of the drive housing part 8. A shim part 13 is arranged on the inside on the front wall 11. The end 10 of the intermediate piece 4 is flanged radially outwards over a rim 14 defining the aperture 12 and over the shim part 13.

The shim part 13 preferably has a plate-shaped configuration, which results in a flat, space-saving construction. It is of advantage to adjust the geometry of the shim part 13 to the geometry of the drive housing, that is, for example, to provide a disk when the housing geometry is substantially cylindrical. In this way, a pressure load exerted on the shim part 13 can be evenly distributed, which has a favorable effect on the service life thereof. But other geometries of the shim part 13 are also possible.

In the embodiment shown, the shim part 13 is a disk spring having a radially outer rim which is supported by a circular rib 15 arranged on the inner surface of the front wall 11. The radially inner rim of the shim part 13 is supported by the flanged rim of the intermediate piece 4, which presses the shim part 13 axially against the front wall 11 or the circular rib 15. In this way, an advantageous prestressing force is produced, which provides for tolerance compensation and freedom from play and ensures a stable connection between the drive housing part 8 and the intermediate piece 4 even when compressed air is applied. The circular rib 15 may be configured to be solid or may include recesses.

The drive housing part 8 is preferably in the form of a pot, the front wall 11 being adjoined by a cylindrical housing wall 16, the two walls more particularly continuing into each other in one piece. This has the advantage that the total number of parts from which the valve is built up is thereby minimized, bringing about a reduction in cost. But the drive housing part 8 may also be assembled from several parts, for example a bottom and a housing wall, which are firmly connected with one another. This could be of advantage in some applications, for example in the case of a manufacture involving machining operations, or when an identical part can possibly be used for all sizes in a production series with different valve sizes.

In the embodiment according to FIG. 2, the front wall 11 has a cylindrical, axial extension 17 at the aperture 12; the extension 17 faces outwards and surrounds the intermediate piece 4. The extension 17 constitutes a prolongation of the aperture 12, serves as a guide for the intermediate piece 4, and contributes to the stabilization of the connection between the drive housing part 8 and the intermediate piece 4.

At least one annular depression 18 is arranged in the extension 17 in an advantageous manner to receive a sealing member 19. The sealing member 19 seals the drive housing to the outside, thereby ensuring a trouble-free operation of the valve.

The intermediate piece 4 includes a radially protruding, circumferential projection 20 which rests axially against a contact surface 21 on the extension 17. Preferably, the projection 20 also lies against the extension 17 laterally. The disk spring braces itself and the front wall 11 between the projection 20 and the flanged end 10. A connecting portion which is completely surrounded by the drive housing part 8 extends between the end 10 of the intermediate piece 4 and this projection 20.

The contact surface 21 may be formed by a terminal edge on the extension 17 or, as shown, by a step-like recess in the extension 17 at the end of the extension. In the latter case, the projection 20 is then completely covered by the extension 17, that is, it is completely seated in the projection 20.

The drive housing part 8 is advantageously arranged so as to be freely rotatable on the intermediate piece 4. This allows a flexible orientation of the control air connections, for example towards the compressed air supply.

A certain resistance to rotation is expedient to secure the rotational orientation of the housing part 8.

Advantageously, the end 10 of the intermediate piece 4 has a lower wall thickness than an adjacent tube section. The lower wall thickness in the portion 22 may be in the form of a small constriction of the outside diameter at the end 10 of the intermediate piece. This facilitates assembly and the flanging process.

In a preferred embodiment, the drive housing is made from a plastic material. A manufacture using an injection molding method allows high degrees of freedom in shape forming. But it is also possible to manufacture metallic drive housings should this be required based on specifications relating to chemical or thermal stability.

What is claimed is:

1. A valve comprising:
    a drive housing part having a front wall with an aperture being defined by a rim,
    a substantially tubular intermediate piece having an end projecting through the aperture from outside into the interior of the drive housing part, and
    a shim part provided on an inside of the front wall,
    an end of the intermediate piece being flanged radially outwards over the rim and over the shim part,
    wherein the flanged end presses the shim part axially against the front wall.

2. A valve comprising:
    a drive housing part having a front wall with an aperture being defined by a rim,
    a substantially tubular intermediate piece having an end projecting through the aperture from outside into the interior of the drive housing part, and
    a shim part provided on an inside of the front wall,
    an end of the intermediate piece being flanged radially outwards over the rim and over the shim part,
    wherein the shim part is in the form of a washer and a disk spring.

3. A valve comprising:
    a drive housing part having a front wall with an aperture being defined by a rim,
    a substantially tubular intermediate piece having an end projecting through the aperture from outside into the interior of the drive housing part, and
    a shim part provided on an inside of the front wall,
    an end of the intermediate piece being flanged radially outwards over the rim and over the shim part,
    wherein a cylindrical, axial extension facing outwards is formed on the front wall at the aperture and surrounds the intermediate piece.

4. The valve as claimed in claim 3, wherein at least one depression is provided in the extension to receive a sealing member.

5. The valve as claimed in claim 3, wherein a radially protruding, circumferential projection is provided on the intermediate piece, the projection resting against a contact surface on the extension.

6. The valve as claimed in claim 5, wherein the contact surface is formed as part of a step-like recess in the extension at the end of the extension.

7. A valve comprising:
    a drive housing part having a front wall with an aperture being defined by a rim,
    a substantially tubular intermediate piece having an end projecting through the aperture from outside into the interior of the drive housing part, and
    a shim part provided on an inside of the front wall,
    an end of the intermediate piece being flanged radially outwards over the rim and over the shim part,
    wherein the drive housing part is arranged so as to be freely rotatable on the intermediate piece.

* * * * *